(12) United States Patent
Sato et al.

(10) Patent No.: US 9,989,656 B2
(45) Date of Patent: Jun. 5, 2018

(54) RADIATION IMAGING APPARATUS

(71) Applicant: CANON KABUSHIKI KAISHA, Tokyo (JP)

(72) Inventors: Eriko Sato, Tokyo (JP); Toshio Kameshima, Kumagaya (JP); Tomoyuki Yagi, Honjo (JP); Katsuro Takenaka, Honjo (JP); Atsushi Iwashita, Saitama (JP); Hideyuki Okada, Honjo (JP); Takuya Ryu, Kokubunji (JP); Kosuke Terui, Honjo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 55 days.

(21) Appl. No.: 14/849,735

(22) Filed: Sep. 10, 2015

(65) Prior Publication Data

US 2016/0084969 A1    Mar. 24, 2016

(30) Foreign Application Priority Data

Sep. 24, 2014  (JP) ................................. 2014-194298

(51) Int. Cl.
*G01T 1/24* (2006.01)
*H04N 5/32* (2006.01)
*H04N 5/361* (2011.01)

(52) U.S. Cl.
CPC ............. *G01T 1/247* (2013.01); *G01T 1/241* (2013.01); *H04N 5/32* (2013.01); *H04N 5/3205* (2013.01); *H04N 5/361* (2013.01)

(58) Field of Classification Search
CPC ........ H04N 5/361; H04N 5/3597; H04N 3/155; H04N 3/1568; H04N 5/3205; A61B 6/542; G01T 1/24
See application file for complete search history.

(56) References Cited

U.S. PATENT DOCUMENTS

| 6,307,915 | B1 * | 10/2001 | Frojdh ..................... G01T 1/17 348/E3.02 |
| 6,404,854 | B1 * | 6/2002 | Carroll .................. A61B 6/145 348/E3.02 |
| 7,403,594 | B2 | 7/2008 | Endo et al. ................... 378/114 |
| 7,541,591 | B2 | 6/2009 | Endo et al. ................... 250/369 |
| 7,573,038 | B2 | 8/2009 | Yokoyama et al. ..... 250/370.09 |
| 9,134,432 | B2 | 9/2015 | Iwashita et al. .......... G01T 1/16 |

(Continued)

FOREIGN PATENT DOCUMENTS

| JP | 2011-223088 | 11/2011 |
| JP | 2012-247354 | 12/2012 |

OTHER PUBLICATIONS

U.S. Appl. No. 14/801,549, filed Jul. 16, 2015.

*Primary Examiner* — Kenneth J Malkowski
(74) *Attorney, Agent, or Firm* — Fitzpatrick Cella Harper and Scinto

(57) ABSTRACT

A radiation imaging apparatus includes a pixel array where a plurality of pixels configured to detect radiation are arrayed, a sensor configured to detect radiation irradiation for exposure control, a reader configured to read out signals from the plurality of pixels and the sensor, and a processor configured to process the signals read out by the reader. The processor corrects, based on the signals read out from the sensor by the reader, the signals read out from the plurality of pixels by the reader.

17 Claims, 6 Drawing Sheets

(56) References Cited

U.S. PATENT DOCUMENTS

| | | | |
|---|---|---|---|
| 9,201,149 B2* | 12/2015 | Ben Hayun | G01T 1/2006 |
| 2011/0020933 A1* | 1/2011 | Kruse | C12M 33/00 |
| | | | 435/395 |
| 2012/0075600 A1* | 3/2012 | Sato | G03B 42/02 |
| | | | 355/18 |
| 2012/0305791 A1 | 12/2012 | Watanabe et al. | 250/394 |
| 2013/0051524 A1* | 2/2013 | Sato | A61B 6/5205 |
| | | | 378/62 |
| 2013/0206959 A1* | 8/2013 | Zhang | H04N 5/361 |
| | | | 250/208.1 |
| 2013/0264488 A1 | 10/2013 | Sugawara et al. | 250/394 |
| 2014/0239187 A1 | 8/2014 | Iwashita et al. | 250/394 |
| 2014/0241501 A1 | 8/2014 | Sato et al. | 378/62 |
| 2014/0361189 A1 | 12/2014 | Kameshima et al. | 250/393 |
| 2015/0078528 A1* | 3/2015 | Okada | A61B 6/542 |
| | | | 378/97 |
| 2015/0338530 A1 | 11/2015 | Okada et al. | 250/394 |

* cited by examiner

F I G. 2
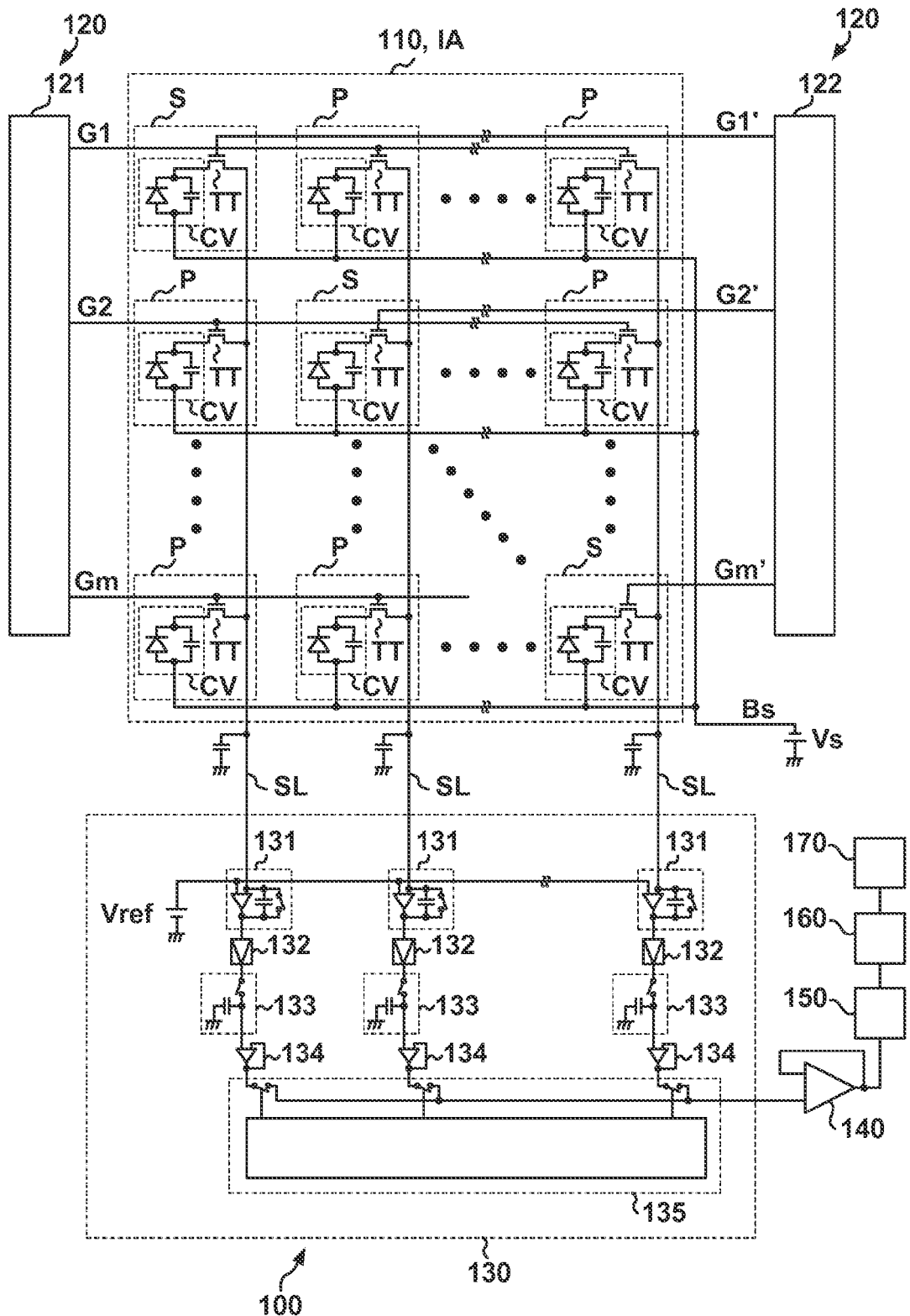

RADIATION IMAGING APPARATUS

BACKGROUND OF THE INVENTION

Field of the Invention

The present invention relates to a radiation imaging apparatus.

Description of the Related Art

As a radiation imaging apparatus which captures an image of radiation such as X-rays, a radiation imaging apparatus with a radiation imaging panel where conversion elements which convert radiation into charges are arrayed two-dimensionally is known. Some conversion elements convert radiation into visible light and then convert this visible light into the charges, or convert radiation into the charges directly. Each conversion element includes a semiconductor layer. A dark current generated in this semiconductor layer becomes an offset component to cause shading.

Japanese Patent Laid-Open No. 2011-223088 has described an imaging apparatus which corrects, based on a dark signal amount by a dark current, charge information at the time of radiation irradiation. The imaging apparatus described in Japanese Patent Laid-Open No. 2011-223088 includes a plurality of temperature sensors on the periphery of a conversion layer which converts information on light or radiation into charge information and measures a temperature distribution by these sensors. When capturing a radiation image, a dark signal amount is obtained based on the correlation between the temperature distribution and the dark signal amount stored in advance and the temperature distribution obtained by using the plurality of temperature sensors, and the charge information is corrected based on this dark signal amount. In a method described in Japanese Patent Laid-Open No. 2011-223088, correction is made based on the correlation between the temperature distribution and the dark signal amount stored in advance, and the temperature distribution measured when capturing the radiation image. Therefore, the temperature sensors and a memory which stores the correlation are indispensable, complicating an arrangement. In the method, a dark signal amount is not actually measured at the time of image capturing. As a result, a deviation may occur between the dark signal amount obtained based on the correlation and the actual dark signal amount.

A radiation imaging apparatus having an exposure control function is also known. Japanese Patent Laid-Open No. 2012-247354 has described a radiation image detection apparatus which detects at least one of the start and the end of radiation irradiation. The radiation image detection apparatus includes an imaging region where a plurality of pixels are arrayed in a matrix and a plurality of detection elements which output electrical signals corresponding to the incident amount of radiation. The radiation image detection apparatus detects at least one of the start and the end of radiation irradiation based on the output of a detection element having a high sensitivity out of the plurality of detection elements.

Note that a technique of correcting a radiation image based on information obtained by a detection element or sensor for exposure control is not known.

SUMMARY OF THE INVENTION

One embodiment of the present invention provides a technique advantageous in removing a noise component more accurately with a simple arrangement.

One embodiment of the present invention provides a radiation imaging apparatus comprising: a pixel array where a plurality of pixels configured to detect radiation are arrayed; a sensor configured to detect radiation irradiation for exposure control; a reader configured to read out signals from the plurality of pixels and the sensor; and a processor configured to process the signals read out by the reader, wherein the processor corrects, based on the signals read out from the sensor by the reader, the signals read out from the plurality of pixels by the reader.

Further features of the present invention will become apparent from the following description of exemplary embodiments with reference to the attached drawings.

BRIEF DESCRIPTION OF THE DRAWINGS

FIG. 2 is a view showing the arrangement of a radiation imaging panel according to the first embodiment of the present invention;

DESCRIPTION OF THE EMBODIMENTS

A radiation imaging system of the present invention will exemplarily be described below through embodiments thereof with reference to the accompanying drawings.

Figure 1:
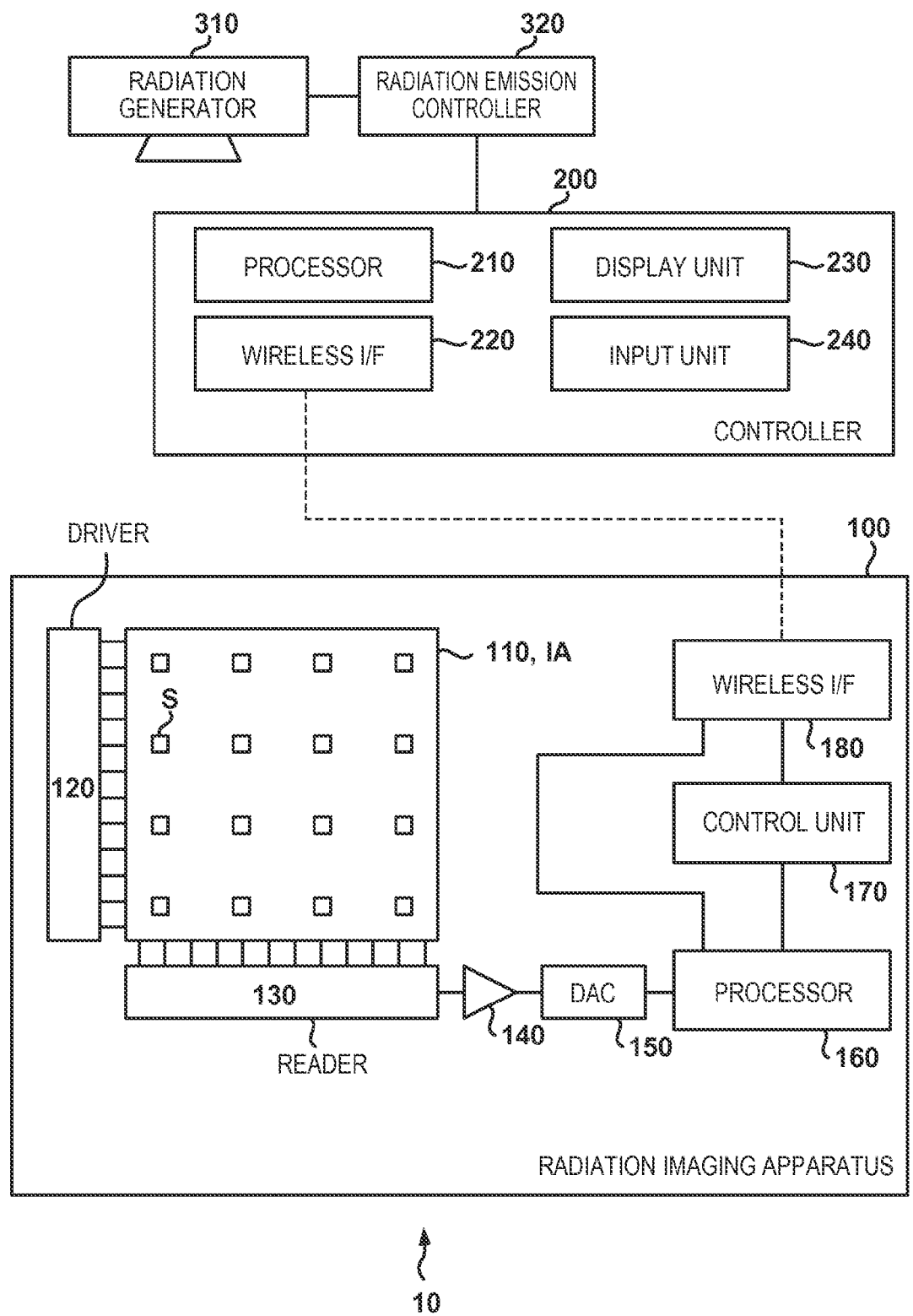
FIG. 1 is a diagram showing the arrangement of a radiation imaging system according to an embodiment of the present invention.

FIG. 1 shows the arrangement of a radiation imaging system 10 according to an embodiment of the present invention. The radiation imaging system 10 can include, for example, a radiation imaging apparatus 100, a controller 200, a radiation generator 310, and a radiation emission controller 320. All or part of the arrangement of the controller 200 may be integrated in the radiation imaging apparatus 100. An apparatus constituted by all or part of the arrangement of the radiation imaging apparatus 100 and all or part of the arrangement of the controller 200 can also be recognized as the radiation imaging apparatus. The controller 200 and the radiation emission controller 320 may be implemented as one apparatus.

The radiation imaging apparatus 100 can include, for example, a pixel array 110, one or a plurality of sensors S, a driver 120, a reader 130, an amplifier (impedance converter) 140, a D/A converter 150, a processor 160, a control unit 170, and a wireless interface (I/F) 180. A plurality of pixels which detect radiation are arrayed in the pixel array 110. The one or the plurality of sensors S are typically arranged in an imaging area IA constituted by the plurality of pixels in the pixel array 110. Further, the plurality of sensors S can typically be arrayed in the imaging area IA in a distributed manner.

The driver 120 drives the plurality of pixels in the pixel array 110 and the one or the plurality of sensors S. The reader 130 reads out signals from the plurality of pixels in the pixel array 110 and the one or the plurality of sensors S. The signals read out from the sensors S by the reader 130 can be used for exposure control, correction of a radiation image captured by the pixel array 110, or the like. The amplifier 140 amplifies the signals read out by the reader 130. The D/A converter 150 converts a signal (analog signal) output from the amplifier 140 into a digital signal.

The processor 160 processes signals read out by the reader 130 from the plurality of pixels which constitute the pixel array 110 and signals read out by the reader 130 from the one or the plurality of sensors S. For example, the processor 160 corrects, based on the signals read out by the reader 130 from the one or the plurality of sensors S, the signals read out by the reader 130 from the plurality of pixels which constitute the pixel array 110. In this embodiment, the signals processed by the processor 160 are signals obtained by processing the signals output from the reader 130 with the amplifier 140 and the D/A converter 150. However, the processor 160 may be configured to process the signals supplied from the reader 130 without passing through the amplifier 140 and/or the D/A converter 150 because the signals output from the reader 130, the amplifier 140, and the D/A converter 150 are equal to each other.

The processor 160 generates an exposure control signal based on the signals read out by the reader 130 from the one or the plurality of sensors S in a state in which the radiation imaging apparatus 100 is irradiated with radiation. The exposure control signal can be obtained by correcting, based on the signals read out by the reader 130 from the one or the plurality of sensors S in a radiation non-irradiation state, the signals read out by the reader 130 from the one or the plurality of sensors S in a radiation irradiation state.

The control unit 170 controls the pixel array 110, the one or the plurality of sensors S, the driver 120, the reader 130, the amplifier 140, the D/A converter 150, the processor 160, and the wireless I/F 180. Further, based on the exposure control signal generated by the processor 160, the control unit 170 sends a radiation emission stop command to the radiation emission controller 320 via the controller 200 so as to stop radiation irradiation by the radiation generator 310.

The wireless I/F 180 communicates with the controller 200 (a wireless I/F 220 thereof). The wireless I/F 180 transmits, to the controller 200, the signal supplied from the processor 160, the radiation emission stop command, a signal indicating the state of the radiation imaging apparatus 100, and the like. The wireless I/F 180 receives, from the controller 200, information indicating that the radiation emission controller 320 has transmitted a radiation emission command to the radiation generator 310 (to be referred to as radiation emission notification information) or the like.

The controller 200 can include, for example, a processor 210, a wireless I/F 220, a display unit 230, and an input unit 240 (a keyboard, a pointing device, or the like). The controller 200 can be formed by integrating software (computer program) in a general-purpose computer.

The radiation emission controller 320 includes a radiation emission switch (not shown). The radiation emission controller 320 transmits the radiation emission command to the radiation generator 310 in response to turning on of the radiation emission switch and notifies the radiation emission controller 320 of this. The radiation generator 310 emits radiation in accordance with the radiation emission command. The controller 200 transmits, to the radiation imaging apparatus 100, radiation emission notification information indicating that the radiation emission command is transmitted to the radiation generator from the radiation emission controller 320.

FIG. 2 shows the arrangement of the radiation imaging apparatus 100 according to the first embodiment of the present invention. A plurality of pixels P are arrayed two-dimensionally in the pixel array 110 so as to form a plurality of rows and a plurality of columns. The imaging area IA is formed by arraying the plurality of pixels P. The plurality of sensors S can be arrayed in a distributed manner in the imaging area IA. In an example shown in FIG. 2, the plurality of sensors S are arrayed on a diagonal line of the imaging area IA. However, this is merely a schematic view and, in practice, the plurality of sensors S can be arranged to be assigned for each group constituted by the plurality of pixels P. In the example shown in FIG. 2, the pixels P are not arranged at coordinates (positions specified by the rows and the columns in the array of the pixels P) where the sensors S are arranged. However, the sensors S smaller than the pixels P arranged at other coordinates may be arranged at the coordinates.

Each pixel P includes a conversion element CV and a switch TT. Similarly, each sensor S also includes the conversion element CV and the switch TT. Each conversion element CV converts radiation into charges. Each conversion element CV can be constituted by a scintillator which converts radiation into visible light and a photoelectric conversion element which converts visible light into the charges. In this case, the plurality of conversion elements CV can share the scintillator. Each conversion element CV may be configured to directly convert radiation into the charges. Each conversion element CV can be constituted by a MIS or a PIN photoelectric conversion element. Each switch TT can be constituted by, for example, a thin-film transistor (TFT). Each switch TT is arranged between one electrode of the conversion element CV and a signal line SL so as to control the connection between them. The other electrode of each conversion element CV is connected to a bias line Bs.

The driver 120 includes a pixel driver 121 which drives the plurality of pixels P and a sensor driver 122 which drives the one or the plurality of sensors S. The gate of the switch TT in each pixel P is connected to one of gate lines G1 to Gm driven by the pixel driver 121. Note that the gate lines G1 to Gm drive the pixels P of the first row to the mth row. The gate of the switch TT in each sensor S is connected to one of gate lines G1' to Gm' driven by the sensor driver 122. Note that the gate lines G1' to Gm' drive the sensors S of the first row to the mth row.

The reader 130 reads out a signal from each pixel P or each sensor S via the signal line SL. The reader 130 includes, for each column in the pixel array 110, an integrating amplifier (amplifier) 131, a variable amplifier 132, a sample and hold circuit 133, and a buffer amplifier 134. The signal output to each signal line SL is amplified by the integrating amplifier 131 and the variable amplifier 132, sampled and held by the sample and hold circuit 133, and amplified by the buffer amplifier 134. The reader 130 includes a multiplexer 135. The signal output from the buffer amplifier 134 provided for each column is selected by the multiplexer 135 and output to the amplifier 140.

Each integrating amplifier 131 includes an operational amplifier, an integral capacitor, and a reset switch. The signal output to each signal line SL is input to the inverting input terminal of an operational amplifier 105, a reference voltage Vref is input to the non-inverting input terminal, and the amplified signal is output from the output terminal. The integral capacitor is arranged between the inverting input terminal and the output terminal of the operational amplifier. Each variable amplifier 132 amplifies the signal from the integrating amplifier 131 at an amplification factor designated by the control unit 170. Each sample and hold circuit 133 can be formed from a sampling switch and a sampling capacitor.

Figure 3:
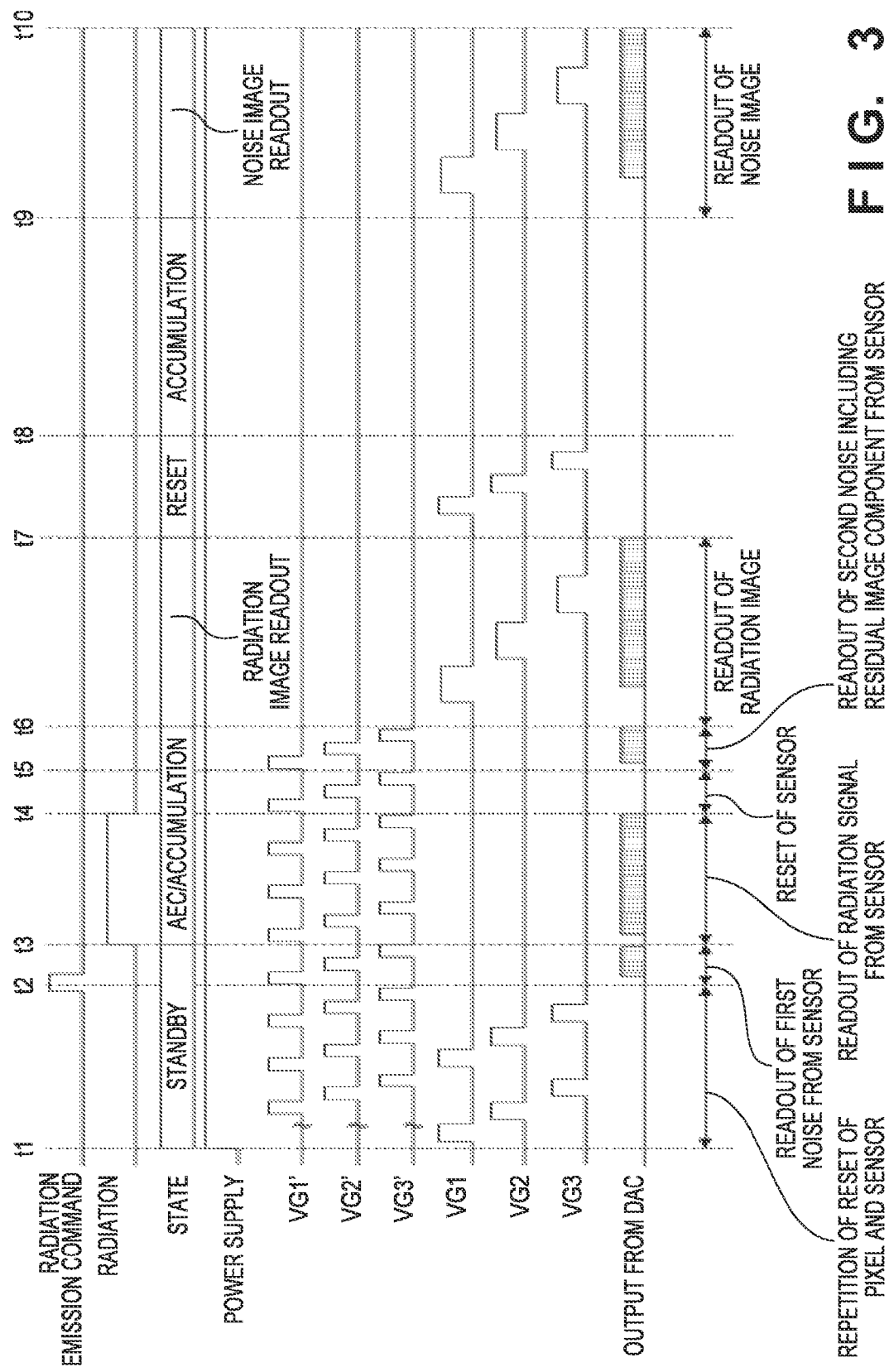
FIG. 3 is a timing chart showing an operation example of the radiation imaging system according to an embodiment of the present invention.

The operation of the radiation imaging system 10 will exemplarily be described with reference to FIG. 3. In FIG. 3, a "radiation emission command" is transmitted from the radiation emission controller 320 to the radiation generator 310 and commands a change from low level to high level. "Radiation" is generated by the radiation generator 310, indicates that radiation is emitted at high level, and indicates that radiation is not emitted at low level. A "state" indicates the state of each pixel P in the pixel array 110. Each of "VG1'" to "VGm'" indicates the logical level of each of the gate lines G1' to Gm' driven by the sensor driver 122. Each of "VG1" to "VGm" indicates the logical level of each of the gate lines G1 to Gm driven by the pixel driver 121. A "signal from a DAC" is output from the reader 130 via the amplifier 140 and the D/A converter 150.

In a period (t1 to t2) until the radiation emission notification information is received from the controller 200, the control unit 170 controls the sensor driver 122 to sequentially drive the gate lines VG1' to VGm' to an active level. When each of the gate lines VG1' to VGm' becomes the active level, the switch TT having the gate connected to it is turned on and the sensor S (the conversion element CV thereof) having the switch TT is reset. Note that resetting each sensor S means removing the charges accumulated in the conversion element CV of each sensor S. That is, the sensors S are reset periodically until the radiation emission notification information is received from the controller 200.

Similarly, in the period (t1 to t2) until the radiation emission notification information is received from the controller 200, the control unit 170 controls the pixel driver 121 to sequentially drive the gate lines VG1 to VGm to the active level. When each of the gate lines VG1 to VGm becomes the active level, the switch TT having the gate connected to it is turned on and the pixel P (the conversion element CV thereof) having the switch TT is reset. Note that resetting each pixel P means removing the charges accumulated in the conversion element CV of each pixel P. That is, the pixels P are reset periodically until the radiation emission notification information is received from the controller 200.

Typically, the number of rows where the sensors S are arranged is smaller than the number of rows of the pixels P which constitute the pixel array 110. Further, a period during which the active-level signal is applied to the gate of the switch TT in each sensor S can be set shorter than a period during which the active-level signal is applied to the gate of the switch TT in each pixel P. Furthermore, a time required to reset all the sensors S (one cycle for resetting) can be set shorter than a time required to reset all the pixels P (one cycle for resetting).

In response to reception (t2) of the radiation emission notification information from the controller 200, the control unit 170 stops periodical resetting the pixels P of the pixel array 110. Note that periodical resetting of the pixels P in the pixel array 110 is preferably stopped by the time radiation irradiation from the radiation generator 310 is started after the reception (t2) of the radiation emission notification information from the controller 200. A time elapsed before radiation irradiation from the radiation generator 310 is started after the reception (t2) of the radiation emission notification information from the controller 200 can be determined by, for example, the characteristics of the radiation generator 310 or the transmission time of the radiation emission notification information in the radiation emission controller 320 and the controller 200. Upon stopping periodical resetting of the pixels P in the pixel array 110, accumulation of the charges corresponding to radiation which irradiates the conversion elements CV is started in the pixels P of the pixel array 110.

Upon receiving the radiation emission notification information from the controller 200, in a first period (t2 to t3) determined by using the reception as a trigger, the control unit 170 controls the sensor driver 122 and the reader 130 to read out offset signals from the plurality of sensors S. The first period (t2 to t3) is started in response to the transmission of the radiation emission command from the radiation emission controller 320 to the radiation generator 310. In the first period (t2 to t3), noise is sampled, and radiation has not been emitted from the radiation generator 310 yet even though the radiation emission command had been transmitted.

In the first period (t2 to t3), the control unit 170 controls the sensor driver 122 and the reader 130 to read out first noise from the plurality of sensors S. The first noise can include, for example, offset noise of the reader 130, the amplifier 140, and the D/A converter 150, in addition to dark current noise corresponding to the charges accumulated in the sensors S owing to a dark current or the like after resetting the sensors S. The sensor driver 122 sequentially drives the gate lines VG1' to VGm' to the active level in the first period. Assume that the coordinates (positions) in the pixel array 110 is specified by the numbers of the rows and columns formed by the pixels P. The first noise read out from the sensor S arranged on the xth row and the yth column of the pixel array 110 is notated as n1(x, y). The first noise n1(x, y) is held by a memory in the processor 160.

A later period (t3 to t4) includes a period during which the radiation imaging apparatus 100 is irradiated with radiation. In the period (t3 to t4), the control unit 170 controls the sensor driver 122 and the reader 130 to periodically read out the signals from the plurality of sensors S under radiation irradiation. Further, the control unit 170 generates an exposure control signal based on the signals read out from the sensors S by the reader 130 and detects, based on the exposure control signal, that radiation irradiation from the radiation generator 310 should be terminated. At this time, the control unit 170 generates, as an exposure control signal, the difference between the signals read out from the sensors S by the reader 130 in the radiation irradiation state and the first noise n1(x, y) held in the first period in a radiation irradiation state. Then, the control unit 170 detects, based on the exposure control signal, or more specifically, based on the integrated value of the exposure control signal, that radiation irradiation should be stopped.

When the integrated value reaches a predetermined value (t4), the control unit 170 transmits, in response to this, the radiation emission stop command to the radiation emission controller 320 via the controller 200. In response to this, the radiation emission controller 320 causes the radiation generator 310 to stop emitting radiation.

In a later period (t4 to t5), the control unit 170 controls the sensor driver 122 to sequentially drive the gate lines VG1' to VGm' to the active level and resets the sensors S.

In a later second period (t5 to t6), the control unit 170 controls the sensor driver 122 and the reader 130 to read out, from the plurality of sensors S, second noise n2(x, y) including a residual image component ai(x, y). The residual image component ai(x, y) is a signal generated as a result of an increase in the dark current by irradiating the sensors S with radiation in the period (t3 to t4) and still remains after resetting the sensors S.

The second noise n2(x, y) includes a noise component nearly equal to the first noise n1(x, y) and the residual image component ai(x, y). It is therefore possible to obtain the residual image component ai(x, y) by calculating the difference between the second noise n2(x, y) and the first noise n1(x, y) (that is, n2(x, y)−n1(x, y)). The processor 160 decides, based on the residual image component ai(x, y) obtained based on the signals read out from the plurality of sensors S, residual image components ai'(x, y) at all coordinates (x, y) by interpolation or the like. As will be described later, the residual image components ai'(x, y) are used to correct radiation image signals.

The residual image components become larger as the intensity of radiation entering the radiation imaging apparatus 100 increases. For example, in the imaging area IA, the residual image component generated in a portion where radiation enters without passing through an object is larger than the residual image component generated in a portion where radiation which has passed through the object enters. The transmittance of radiation varies depending on the tissue of the object. Therefore, the residual image components appear as information having densities in the imaging area IA. The residual image components are included in the signals read out from the pixels P irradiated with radiation, in addition to the signals read out from the sensors S irradiated with radiation. The residual image components included in the signals read out from the pixels P are also signals generated as a result of the increase in the dark current by irradiating the pixels P with radiation in the period (t3 to t4) and still remain after resetting the pixels P. In this embodiment, the residual image components included in the signals read out from the pixels P irradiated with radiation are removed or reduced based on the residual image components ai'(x, y) obtained based on the signals read out from the sensors S.

In a period (t6 to t7), the control unit 170 controls the pixel driver 121 and the reader 130 to read out the radiation image signals from the plurality of pixels P which constitute the pixel array 110. Let S(x, y) be the radiation image signals of the pixels P arranged at the coordinates (x, y) read out by the reader 130 in the period (t6 to t7). The radiation image signals S(x, y) include a true radiation image signal I(x, y) and a noise image signal N(x, y). That is, S (x, y)=I (x, y)+N (x, y) holds.

In a later period (t7 to t8), the control unit 170 controls the pixel driver 121 and the reader 130 to reset the plurality of pixels P which constitute the pixel array 110.

In a later period (t9 to t10), the control unit 170 controls the pixel driver 121 and the reader 130 to read out noise image signals N'(x, y) from the plurality of pixels P which constitute the pixel array 110. Each noise image signal N'(x, y) includes noise nearly equal to the noise image signal N(x, y) included in a radiation image signal A(x, y) and a residual image component AI(x, y). That is, N'(x, y)=N(x, y)+AI(x, y) holds.

Since the pixels P and the sensors S arranged in the positions close to each other are irradiated with radiation nearly equally, the residual image component AI(x, y) is strongly correlated to the residual image component ai(x, y). Therefore, for example, AI(x, y)=α×ai(x, y) holds. Note that α is a coefficient depending on, for example, time and the timing of resetting in the pixels P and the sensors S, and can be obtained by a simulation, measurement, or the like.

By summarizing the above, the following equations hold.

$S(x,y)=I(x,y)+N(x,y)$ $N'(x,y)=N(x,y)+AI(x,y)$ $AI(x,y)=\alpha \times ai(x,y)$

These equations yield:

$$I(x, y) = S(x, y) - N(x, y) \qquad (1)$$
$$= S(x, y) - (N'(x, y) - AI(x, y))$$
$$= S(x, y) - N'(x, y) + \alpha \times ai(x, y)$$

That is, the processor 160 can obtain, based on equation (1), the radiation image signal I(x, y) with noise including the residual image components being removed or reduced. The radiation image signal I(x, y) obtained by the processor 160 can be sent to the controller 200 via the wireless I/F 180.

Figure 4:
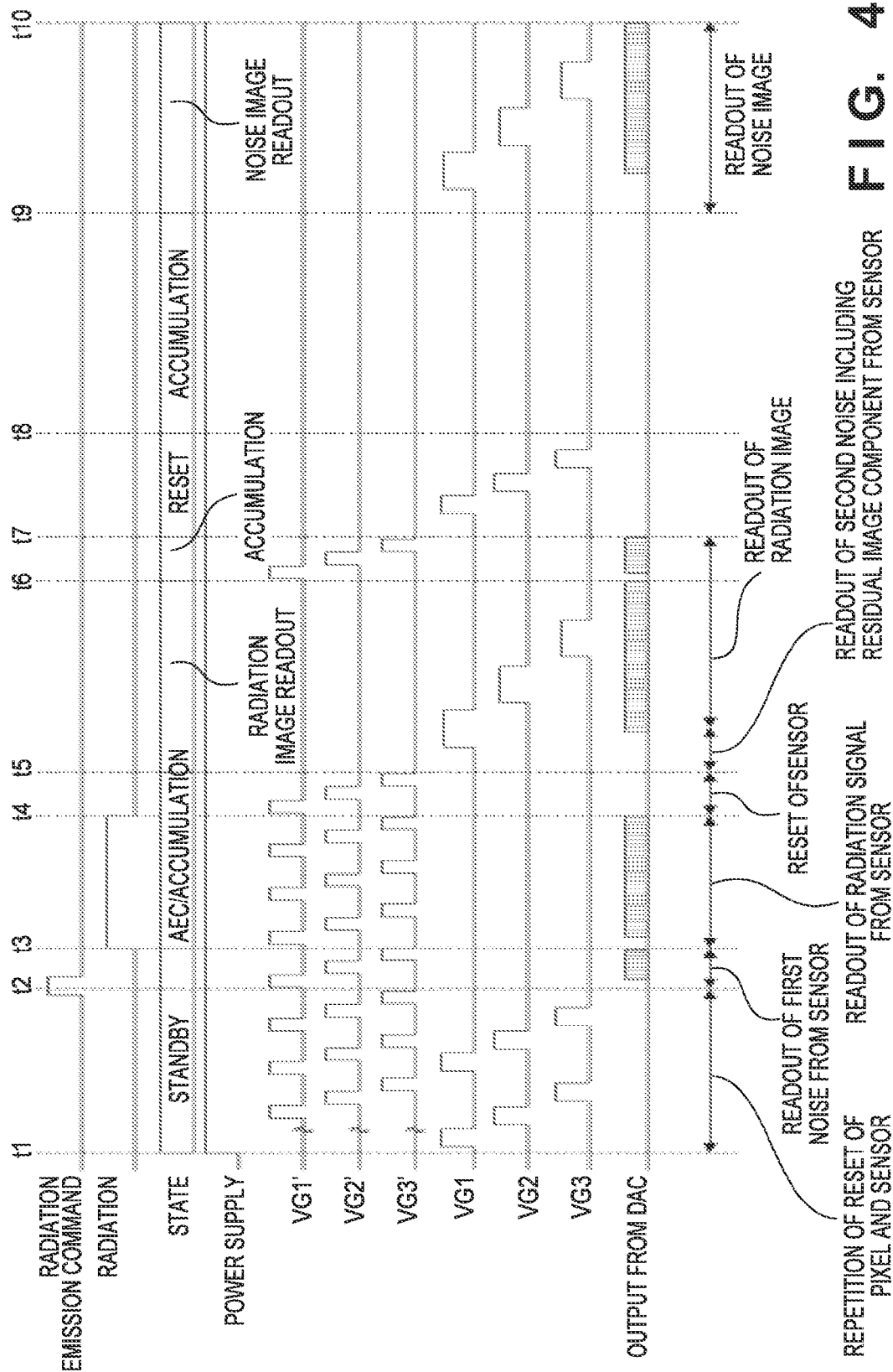
FIG. 4 is a timing chart showing another operation example of the radiation imaging system according to an embodiment of the present invention.

In an operation example shown in FIG. 3, the second noise n2(x, y) is read out before reading out the radiation image signals S(x, y) in the period (t6 to t7). However, this is merely an example. As shown in an operation example shown in FIG. 4, the second noise n2(x, y) may be read out in the third period (t6 to t7) after reading out the radiation image signals S(x, y) in the period (t5 to t6). In reading out the radiation image signals S(x, y), the pixel array 110, the driver 120, the reader 130, the amplifier 140, the D/A converter 150, and the like consume considerable power. The residual image components can be large owing to heat generated by the considerable power consumption. Therefore, it may be more advantageous in reading, as in the operation example shown in FIG. 4, the second noise n2(x, y) after reading out the radiation image signals S(x, y) in order to detect the residual image components more accurately.

The above-described embodiment is merely an exemplary embodiment of the present invention, and various modifications can be made. For example, the first noise n1(x, y) may be obtained by using the sensors S in the period (t1 to t2). In this case, the reader 130 may read out the signals from the sensors S instead of resetting the sensors S in the period (t1 to t2).

In a reset operation, the switches of the pixels on odd numbered rows may be sequentially rendered conductive after sequentially rendering the switches of the pixels on even numbered rows conductive. In a readout operation, the switches of the pixels from head rows to last rows may be sequentially rendered conductive. Alternatively, the switches of the pixels from the head rows to the last rows may be sequentially rendered conductive in the reset operation, and the switches of the pixels on the odd numbered rows may be sequentially rendered conductive after sequentially rendering the switches of the pixels on the even numbered rows conductive. Furthermore, in both of the reset operation and the readout operation, the switches of the pixels on the odd numbered rows may be sequentially rendered conductive after sequentially rendering the switches of the pixels on the even numbered rows conductive.

In the reset operation, not only the switches of the pixels on one row are rendered conductive at once, but the switches of the pixels on the plurality of rows may be rendered conductive at the same time. For example, the pixels on all the odd numbered rows may be reset while rendering the pixels on the plurality of odd numbered rows conductive at the same time after resetting the pixels on all the even numbered rows while rendering the pixels on the plurality of even numbered rows conductive at the same time. The reset operation need not be performed in ascending order or descending order of the row numbers. The rows reset continuously may not be adjacent to each other.

Figure 5:
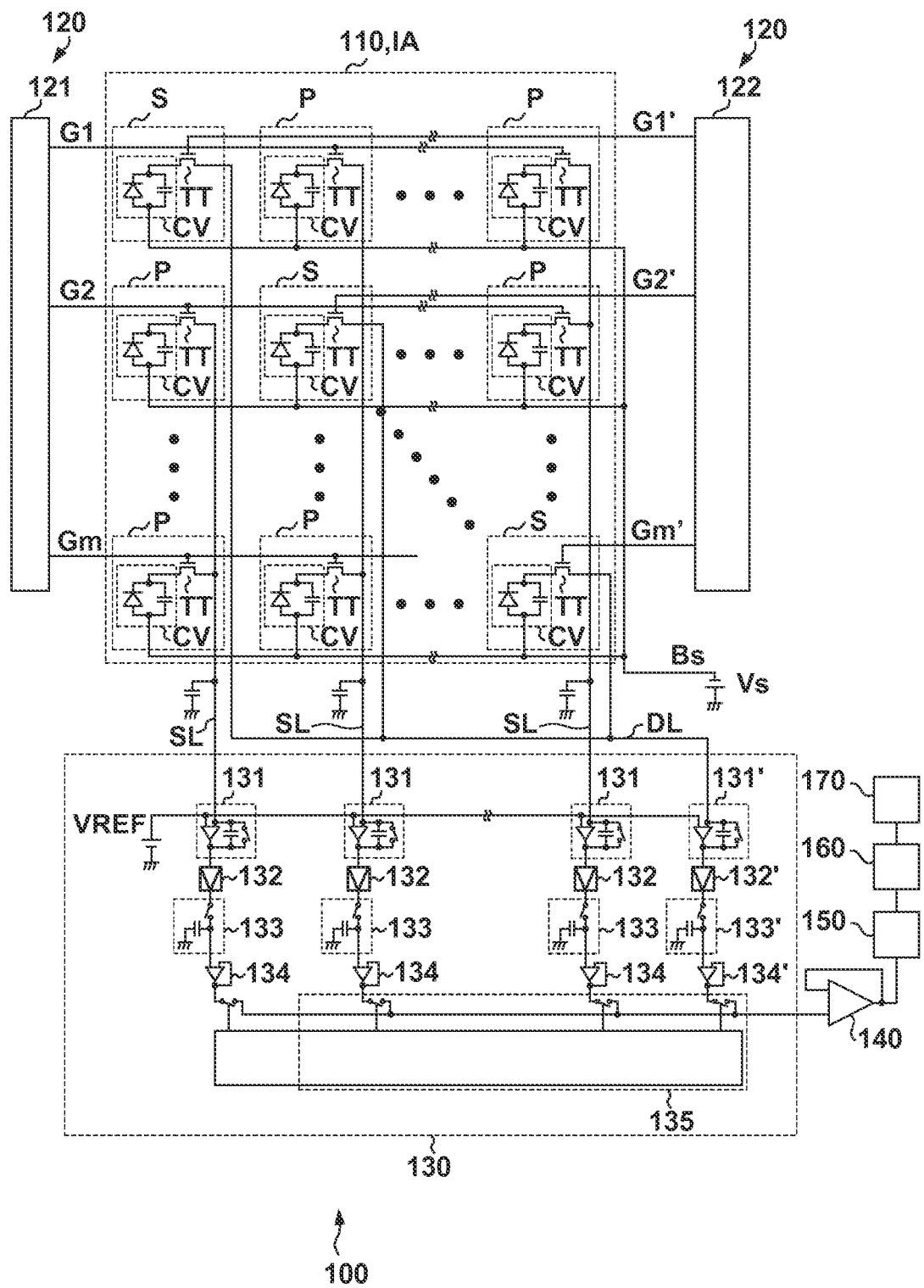
FIG. 5 is a view showing the arrangement of a radiation imaging panel according to the second embodiment of the present invention.

FIG. 5 shows the arrangement of a radiation imaging apparatus 100 according to the second embodiment of the present invention. Matters that are not mentioned in the second embodiment can comply with the first embodiment. In the second embodiment, a reader 130 includes, as dedicated circuits configured to read out signals from sensors S, an integrating amplifier (amplifier) 131', a variable amplifier 132', a sample and hold circuit 133', and a buffer amplifier 134'. The integrating amplifier 131', the variable amplifier 132', the sample and hold circuit 133', and the buffer amplifier 134' can have the same arrangements as those of integrating amplifiers (amplifiers) 131, variable amplifiers 132, sample and hold circuits 133, and buffer amplifiers 134, respectively.

Figure 6:
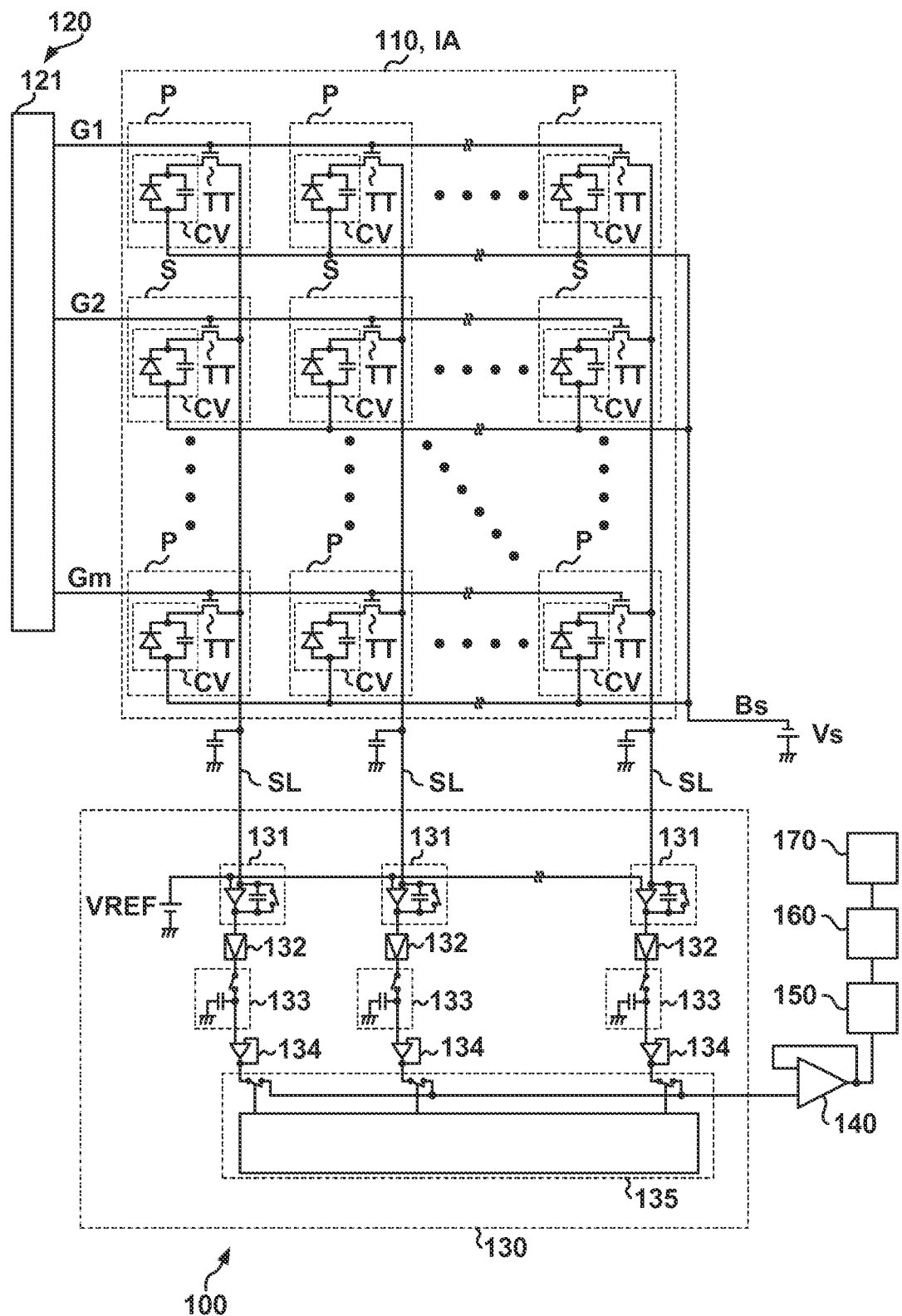
FIG. 6 is a view showing the arrangement of a radiation imaging panel according to the third embodiment of the present invention.

FIG. 6 shows the arrangement of a radiation imaging apparatus 100 according to the third embodiment of the present invention. Matters that are not mentioned in the third embodiment can comply with the first embodiment. In the third embodiment, a pixel array 110 includes a plurality of pixel rows and a plurality of sensor rows. Each pixel row is constituted by a plurality of pixels P and each sensor row is constituted by a plurality of sensors S. In FIG. 6, a row driven by a gate line G2 is illustrated as the sensor row for the descriptive convenience. For example, the sensor rows can be provided at one to a predetermined number of pixel rows.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-194298, filed Sep. 24, 2014, which is hereby incorporated by reference herein in its entirety.

What is claimed is:

1. A radiation imaging apparatus comprising:
a pixel array where a plurality of pixels configured to detect radiation to obtain a radiation image are arrayed;
a sensor configured to detect radiation irradiation;
a reader configured to read out radiation image signals from the plurality of pixels and to read out sensor signals from the sensor; and
a processor configured to process the radiation image signals and the sensor signals read out by the reader, wherein
the sensor is reset after the radiation irradiation stops,
the reader reads out the radiation image signals from the plurality of pixels after the radiation irradiation stops, reads out a first sensor signal from the sensor in a first period before the radiation irradiation starts, and reads out a second sensor signal from the sensor in a second period after the radiation irradiation stops and the sensor is reset, and before the radiation image signals are read out, and
the processor corrects the radiation image signals based on a difference between the first sensor signal and the second sensor signal.

2. The apparatus according to claim 1, wherein the processor generates an exposure control signal based on sensor signals read out from the sensor by the reader in a radiation irradiation state, and
radiation irradiation by a radiation generator is stopped based on the exposure control signal.

3. The apparatus according to claim 2, wherein the processor corrects the sensor signals read out from the sensor by the reader in the radiation irradiation state, thereby generating the exposure control signal, based on sensor signals read out from the sensor by the reader in a radiation non-irradiation state.

4. The apparatus according to claim 1, wherein the difference includes a residual image component which is generated by irradiating the sensor with radiation and remains after resetting the sensor.

5. The apparatus according to claim 1, wherein the reader reads out noise image signals from the plurality of pixels after reading out the radiation image signals, and
the processor corrects the radiation image signals based on the noise image signals and the difference.

6. The apparatus according to claim 5, wherein the plurality of pixels are reset between readout of the radiation image signal and readout of the noise image signal.

7. The apparatus according to claim 6, wherein the second period is a period after the radiation irradiation stops, the sensor is reset, and the radiation image signals are read out, and before the noise image signal is read out.

8. The apparatus according to claim 1, wherein the first period is a period started in response to receiving information indicating that a radiation emission command has been transmitted to the radiation generator.

9. The apparatus according to claim 1, wherein the sensor is arranged in an imaging area constituted by the plurality of pixels.

10. A radiation imaging apparatus comprising:
a pixel array where a plurality of pixels configured to detect radiation to obtain a radiation image are arrayed;

a sensor configured to detect radiation irradiation;

a reader configured to read out radiation image signals from the plurality of pixels and to read out sensor signals from the sensor; and a processor configured to process the radiation image signals and the sensor signals read out by the reader, wherein the sensor is reset after the radiation irradiation stops, the reader reads out the radiation image signals from the plurality of pixels after the radiation irradiation stops, reads out a first sensor signal from the sensor in a first period before the radiation irradiation starts, and reads out a second sensor signal from the sensor in a second period after the radiation irradiation stops and the sensor is reset, and before the radiation image signals are read out, and the processor corrects, based on a difference between the first sensor signal and the second sensor signal, the radiation image signals so that a residual image component included in the radiation image signals is removed or reduced.

11. The apparatus according to claim 10, wherein the processor generates an exposure control signal based on sensor signals read out from the sensor by the reader in a radiation irradiation state, and radiation irradiation by a radiation generator is stopped based on the exposure control signal.

12. The apparatus according to claim 11, wherein the processor corrects the sensor signals read out from the sensor by the reader in the radiation irradiation state, thereby generating the exposure control signal, based on sensor signals read out from the sensor by the reader in a radiation non-irradiation state.

13. The apparatus according to claim 10, wherein the reader reads out noise image signals from the plurality of pixels after reading out the radiation image signals, and the processor corrects the radiation image signals based on the noise image signals and the difference.

14. The apparatus according to claim 13, wherein the plurality of pixels are reset between readout of the radiation image signal and readout of the noise image signal.

15. The apparatus according to claim 14, wherein the second period is a period after the radiation irradiation stops, the sensor is reset, and reading out the radiation image signals are read out, and before the noise image signal is read out.

16. The apparatus according to claim 13, wherein the first period is a period started in response to receiving information indicating that a radiation emission command has been transmitted to the radiation generator.

17. The apparatus according to claim 10, wherein the sensor is arranged in an imaging area constituted by the plurality of pixels.

* * * * *